United States Patent [19]
Hughes

[11] Patent Number: 5,366,299
[45] Date of Patent: Nov. 22, 1994

[54] ARTICULATED VEHICLE AND HINGE ASSEMBLY

[75] Inventor: Daniel L. Hughes, Portland, Oreg.

[73] Assignee: Wagner Mining and Construction Equipment Co., Portland, Oreg.

[21] Appl. No.: 31,176

[22] Filed: Mar. 11, 1993

[51] Int. Cl.⁵ .................... F16C 33/58; B62D 53/02
[52] U.S. Cl. .................. 384/571; 280/400; 384/626
[58] Field of Search ............... 384/563, 571, 583, 585, 384/626; 280/400

[56] References Cited

U.S. PATENT DOCUMENTS

| | | | |
|---|---|---|---|
| 931,924 | 8/1909 | Hess | 384/571 |
| 1,909,525 | 5/1933 | Curtis | 384/571 X |
| 1,982,896 | 12/1934 | Ackerman | 384/571 |
| 2,019,464 | 10/1935 | Riblet et al. | 384/571 X |
| 2,473,307 | 6/1949 | Seipt et al. | 384/626 |
| 2,877,024 | 3/1959 | Storatz | 280/400 |
| 3,411,809 | 11/1968 | Kampert et al. | 280/400 |
| 3,433,502 | 3/1969 | Omon | 280/400 |
| 3,778,174 | 12/1973 | Molby | 280/400 X |
| 3,806,158 | 4/1974 | Casey | 280/400 |
| 3,862,769 | 1/1975 | Bechman et al. | 280/400 |
| 4,192,523 | 3/1980 | Hausmann | 280/400 |
| 4,522,515 | 6/1985 | Miki et al. | 384/571 |
| 4,732,497 | 3/1988 | Sawa et al. | 384/563 X |
| 4,824,264 | 4/1989 | Hoebel | 384/473 |
| 4,900,166 | 2/1990 | Candiard | 384/560 |
| 4,910,846 | 3/1990 | Andreasson et al. | 384/626 X |
| 5,017,025 | 5/1991 | Williams | 384/584 |
| 5,032,029 | 7/1991 | Pratt et al. | 384/585 |

FOREIGN PATENT DOCUMENTS 2091655 8/1982 United Kingdom ............... 280/400

Primary Examiner—Thomas R. Hannon
Attorney, Agent, or Firm—Klarquist Sparkman Campbell Leigh & Whinston

[57] ABSTRACT

A hinge assembly for an articulated vehicle having front and rear frame portions joined at a pair of vertically aligned hinges. Each hinge includes a similar roller bearing assembly attached to the front frame portion and having a rotatable protruding trunnion. The rear frame portion includes recesses for receiving the trunnions and trunnion caps for retaining the trunnions. The trunnion of each bearing assembly includes a shoulder pin with a first bearing cone placed against the shoulder and a second bearing cone spaced apart from the first cone. A spacer ring received on the pin is biased against the second cone by an end cap secured to the end of the pin. A shim pack between the end cap and the end of the pin limits the amount by which the space between the cones may be to limit and control the pre-load of the bearing assembly.

15 Claims, 5 Drawing Sheets

Fig. 2

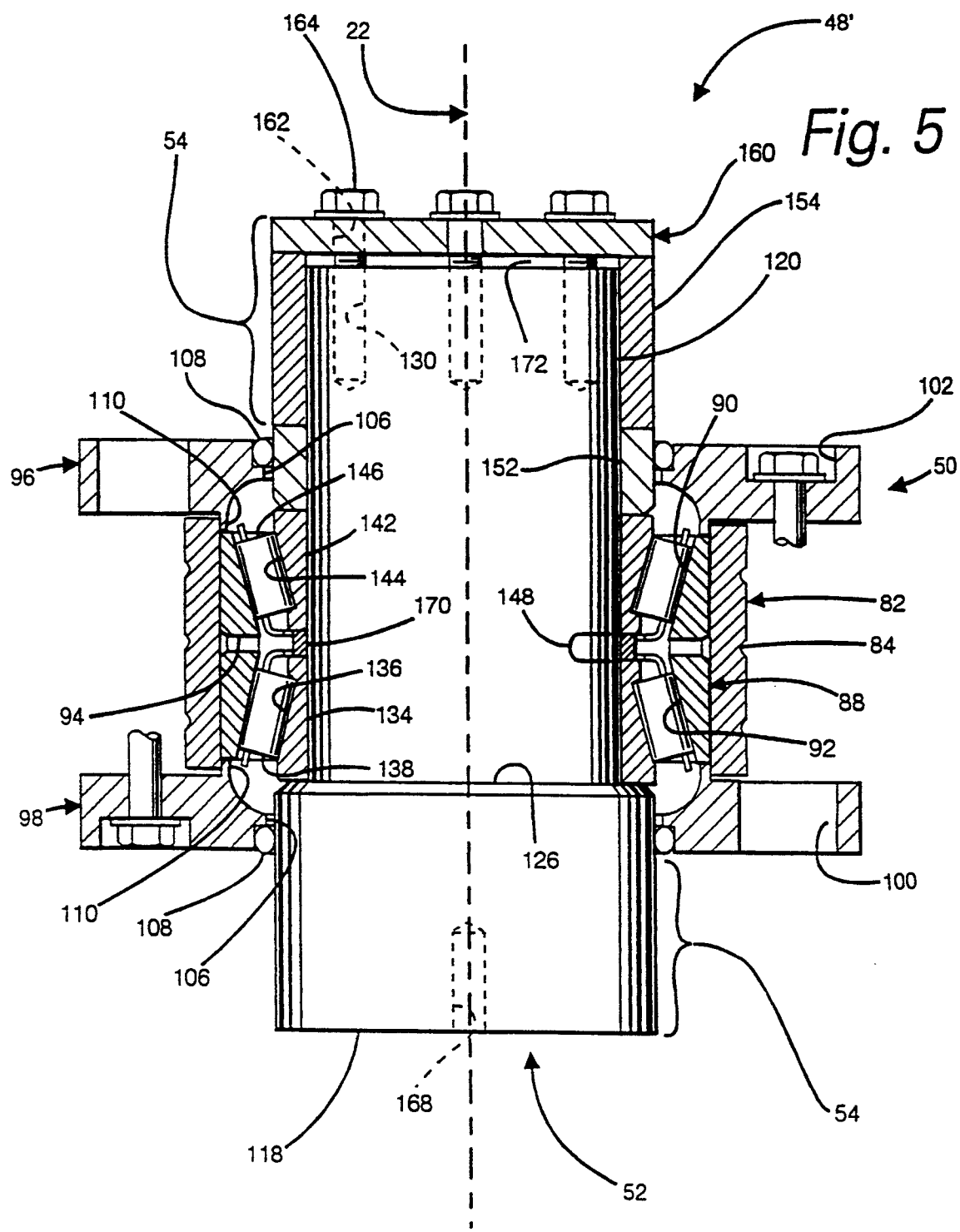

ARTICULATED VEHICLE AND HINGE ASSEMBLY

TECHNICAL FIELD

This invention relates to heavy duty mining and construction vehicles, and more particularly to articulated vehicles having front and rear frames connected by a hinge joint.

BACKGROUND OF THE ART

Articulated vehicle hinge joints must withstand the substantial forces generated by loading, traveling, power train operation and vehicle weight. Ideally, the hinge assemblies should not be excessively bulky or heavy, and should be readily adjustable and replaceable.

A first prior art system uses spherical bearings, as shown in U.S. Pat. No. 3,806,158 to Casey. Spherical bearings function in the manner of a ball-and-socket, and are capable of withstanding large radial and thrust loads because of their large bearing surface contact area. However, spherical bearings are vulnerable to wear because they employ sliding contact. Abrasive contaminants from a construction or mining environment can exacerbate wear.

Roller bearings have been employed in prior art articulated vehicles to avoid the wear problems associated with spherical bearings. However, roller bearings have several disadvantages as applied in the prior art, including weight, bulk, and complexity of maintenance and replacement. One prior art system employs two roller bearing assemblies. The first assembly is a large main bearing having dual races of tapered rollers for transmitting a large portion of the radial load between the frame portions, and for carrying all of the vertical thrust load. The second assembly includes a vertically floating bearing that transmits only radial loads. The second bearing must float to accommodate tolerances between the frame weldments to which the bearings are attached. Sufficiently accurate spacing between the weldments is achievable only by costly machining of the weldment surfaces. If two similar tapered-roller bearing assemblies were attached to a vehicle frame having normal welding tolerance errors, unacceptable thrust pre-loading of the bearings would result, substantially diminishing the bearings' capacity to carry working loads.

A further disadvantage of conventional roller bearing designs is that the fixed main bearing must carry the entire thrust lead, making it bulky and heavy. While the floating bearing may be more compact and lightweight, the bulk and weight of the fixed bearing makes it undesirable for certain applications such as underground mining vehicles requiring compact dimensions. In addition, the frame itself must be larger and heavier at the weldments to which the fixed bearing is attached to transmit the entire vertical lead.

Prior art vehicle hinges using roller bearings are also difficult to service and replace. For maximum system rigidity, a tapered-roller bearing assembly is generally adjusted for a pre-load, meaning that the cone races are biased together to compress the bearing rollers between the cones and the bearing cup. To accommodate minor wear, it may be necessary to adjust the bearing to restore the pre-load to its desired level. Existing roller bearing assemblies require the removal and disassembly of the bearing assembly to adjust the pre-load. This process violates the bearing seal, exposing the interior of the assembly to contaminants, which is particularly a problem when adjustments are required in the field. Furthermore, complete replacement of a prior art bearing assembly usually requires at least two reinstallations to arrive at the proper shim to achieve the desired pre-load in the new bearing. Service and installation in the field also requires heavy, specialized tools that are not ordinarily available, and which would be costly to include on the vehicle.

Because of the foregoing problems associated with existing articulated vehicle hinge assemblies, there is a need for an effective articulated vehicle hinge that overcomes such problems. This, therefore, is the primary objective of the present invention.

SUMMARY OF THE INVENTION

Other important objects of the invention are to provide:

an articulated vehicle hinge assembly as aforesaid in which the assembly is not susceptible to undue wear;

an assembly as aforesaid in which the assembly has limited bulk and weight for use on a compact vehicle;

an assembly as aforesaid which may be serviced and pre-adjusted before installation on the vehicle;

an assembly as aforesaid that is adjustable without violating the bearing seal;

an assembly as aforesaid in which pre-load may be adjusted without disassembly of the vehicle.

According to the illustrated embodiment of the present invention, the primary objects are achieved by providing a hinge assembly for an articulated vehicle having a front frame portion with two integral chassis plates, each having an attached tapered-roller bearing assembly having a rotatable protruding trunnion. The rear frame portion includes corresponding recesses and trunnion caps for capturing the trunnions. Each bearing assembly is similarly sized to share radial and thrust loads, with the trunnion including a journal on which are received spaced apart first and second cones, with the spacing being limited by a journal shoulder abutting the first cone, and by a compression ring received on the journal, abutting the second cone and constrained by an end cap attached to the end of the journal. A shim between the end cap and the end of the journal defines and limits the spacing between the cones. Bearing pre-load may be adjusted by loosening one of the trunnion caps, removing the end cap, replacing the shim with one of a different thickness, replacing the end cap, and the re-securing the trunnion cap.

BRIEF DESCRIPTION OF THE DRAWINGS

FIG. 5 is a cross-sectional side view of a bearing assembly according to an alternative embodiment.

DETAILED DESCRIPTION OF A PREFERRED EMBODIMENT

Figure 1:
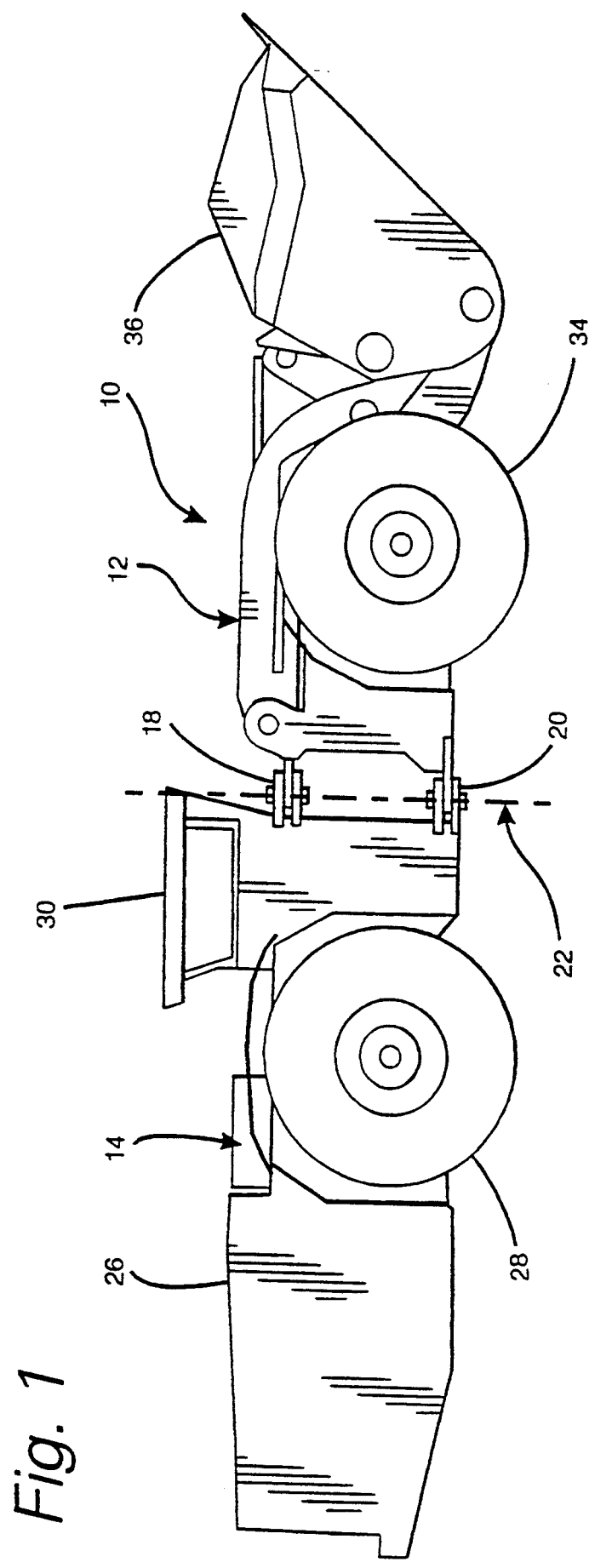
FIG. 1 is a side view of an articulated vehicle according to the preferred embodiment of the invention

FIG. 1 shows an articulated low profile mining vehicle 10 having a front frame portion 12 and a rear frame portion 14 joined together by an upper hinge assembly 18 and a lower hinge assembly 20, providing an articulated joint for pivoting on a vertical hinge axis 22. The rear frame 14 includes a power plant 26, a pair of rear wheels 28, and an operator cab 30. The front frame 12 includes front wheels 34 and a lead bucket assembly 36 positioned at the front of the vehicle.

Figure 2:
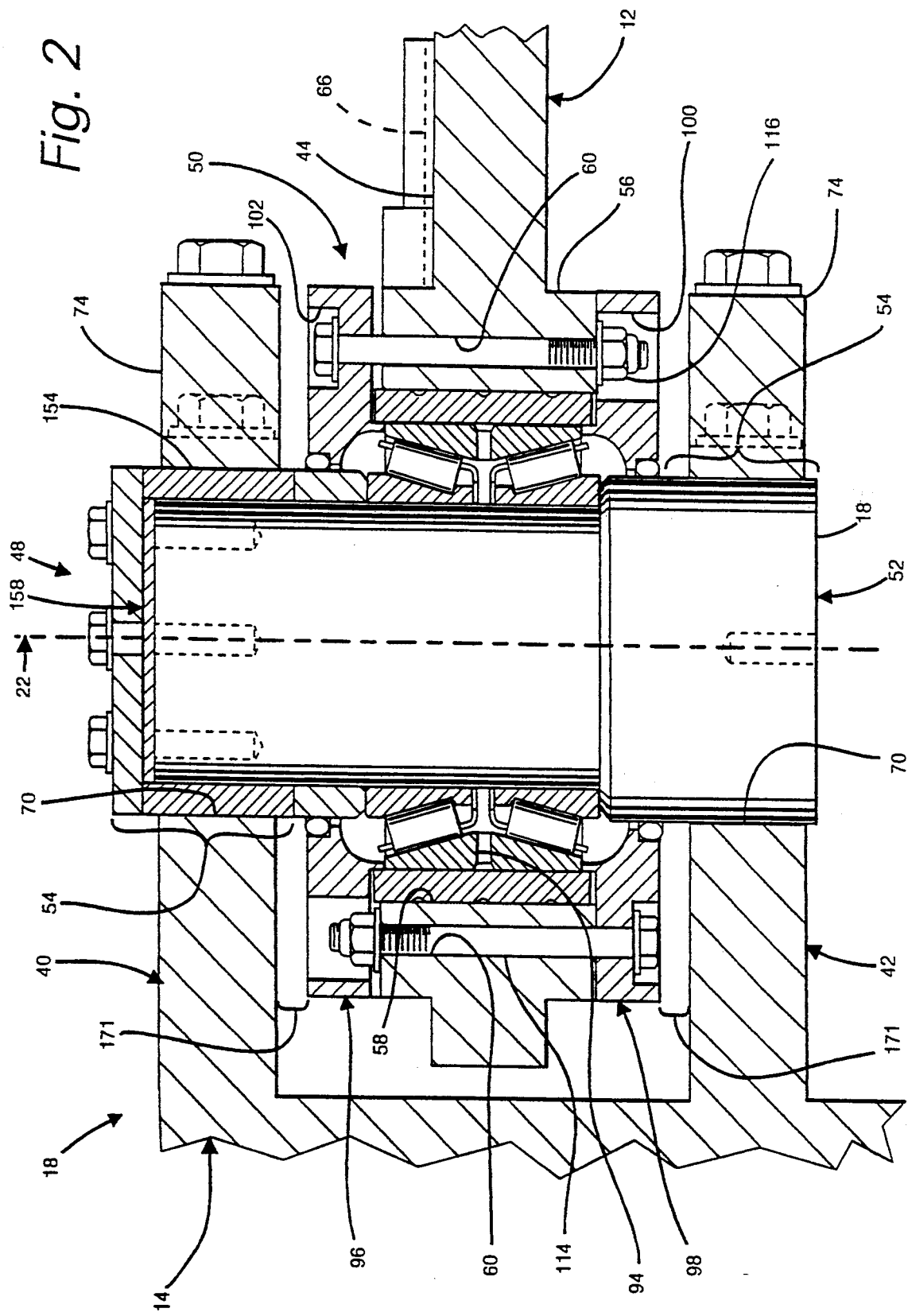
FIG. 2 is a cross-sectional side view of a hinge assembly according to the embodiment of FIG. 1.

FIG. 2 shows the upper hinge assembly 18, which has essentially the same structure and function as the lower hinge assembly 20. The rear frame 14 includes an upper rear chassis plate 40 and a lower rear chassis plate 42. The chassis plates protrude forward in horizontal, spaced-apart, parallel planes. The front frame 12 includes a rearwardly protruding front chassis plate 44 that is horizontally oriented and may be interleaved medially between the rear chassis plates 40 and 42.

A bearing assembly 48 has an outer fixed portion 50 attached to the front chassis plate and a rotatable cylindrical trunnion 52 journaled within the fixed portion. The trunnion has cylindrical portions 54 protruding vertically upwardly and downwardly from the bearing assembly 48, and attached to the rear chassis plates 40, 42.

The front chassis plate 44 includes a circular reinforced portion 56 that protrudes above and below its respective upper and lower surfaces. The reinforced portion 56 centrally defines a machined circular bore 58 aligned on the vertical axis 22 perpendicular to the plate 44. The reinforced portion 56 further defines an evenly spaced circular array of clearance holes 60 drilled entirely through the reinforced portion 56. The plate 44 further includes a conduit 62 defining a passage 66 communicating through an opening (not shown) to the interior of the bore 58 for carrying lubricant into the bore.

Figure 3:
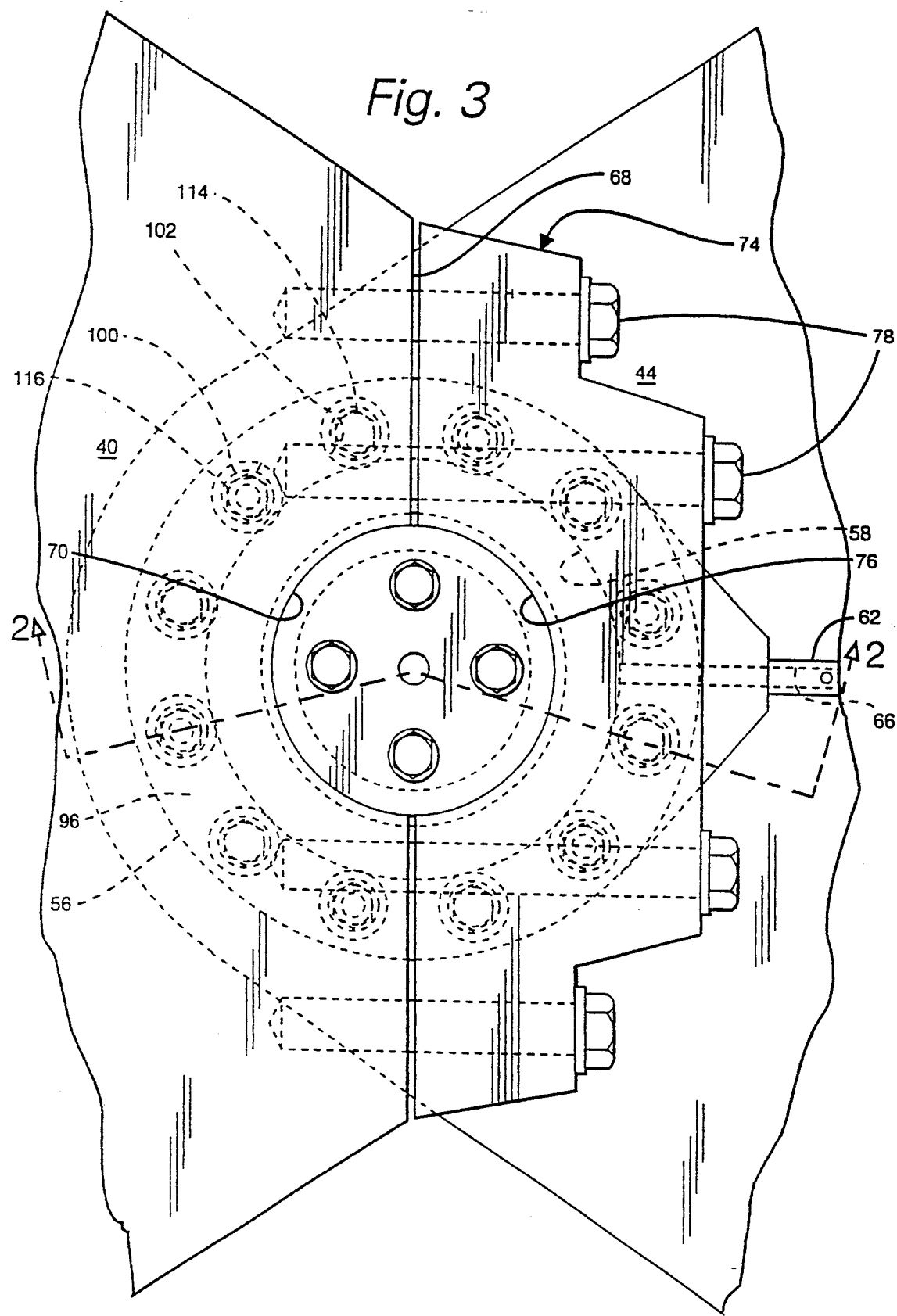
FIG. 3 is a top view of a hinge assembly according to the embodiment of FIG. 1.

As shown in FIG. 3, the upper rear chassis plate 40 terminates forwardly at a flat surface 68, and defines a semi-cylindrical recess 70 having a vertical axis within the plane of the flat surface 68 and centered medially thereon. A trunnion cap 74 defining a semi-cylindrical recess 76 is removably fastened to the rear chassis plate 40 by bolts 78 to closely capture the cylindrical portions 54 of the trunnion 52. The radius of curvature of the cylindrical portions 54, and of the semi-cylindrical recesses 70, 76 are essentially the same to provide a maximum contact area between the trunnion and the recesses.

Figure 4:
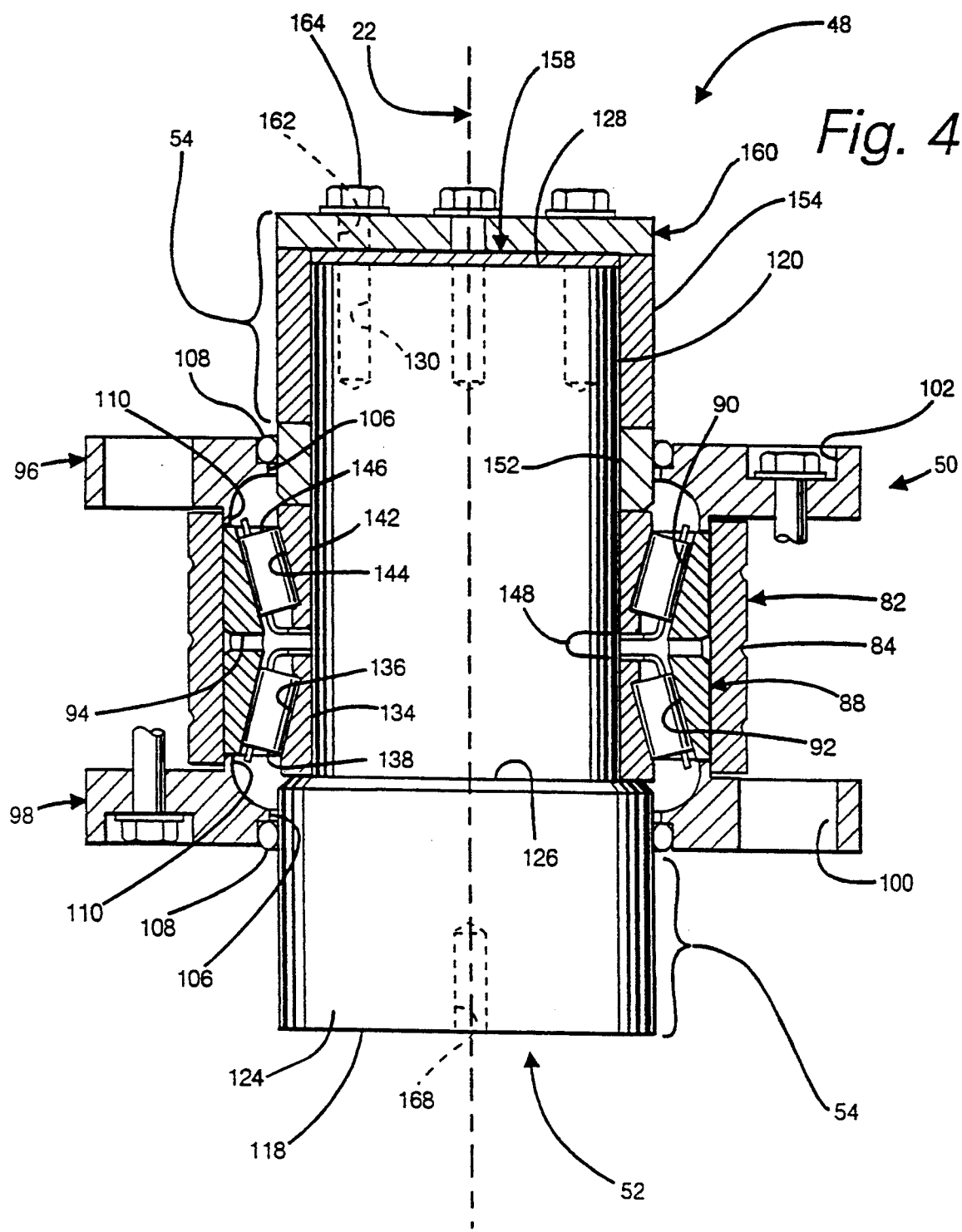
FIG. 4 is a cross-sectional side view of a bearing assembly according to the embodiment of FIG. 1.

FIG. 4 shows the bearing assembly 48 without the vehicle structure to which it is normally attached during use. As noted above, the bearing assembly 48 includes the rotatable trunnion 52 surrounded by the fixed portion 50. The fixed portion 50 includes a cylindrical insert ring 82 having an external diameter sized to be closely received by the bore 58 as shown in FIG. 2. The insert ring 82 has a height equal to the thickness of the reinforced portion 56, and defines a number of circumferential grooves 84 to facilitate the circulation of lubricant provided by the conduit 62. A plurality of radial holes (not shown) transmit lubricant from the grooves 84 to the interior of the ring 82. A dual-race bearing cup 88 is press-fit tightly within the ring 82 and presents a pair of conical races 90, 92 facing inwardly, with the upper race 90 facing slightly upwardly and the lower race 92 facing slightly downwardly. The bearing cup 88 defines a plurality of lubricant holes 94 for transmitting lubricant to the races 90, 92.

A pair of bearing retainer plates 96, 98 are positioned oppositely above and below the cup 88. Each plate has a circular outside diameter corresponding to the diameter of the reinforced portion 56 of the front chassis plate 44 (see FIG. 2) and includes an alternating series of large access holes 100 and counterbored clearance holes 102 registrable with the clearance holes 60 of the front chassis plate, as shown in FIG. 3. Referring back to FIG. 4, each plate 96, 98 defines a central aperture 106 carrying a shaft seal 108 to closely and sealably receive the protruding cylindrical portions 54 of the trunnion 52. Each plate 96, 98 further includes a lip 110 concentric with the aperture 106 and corresponding to the diameter of the cup 88. The lips 110 protrude sufficiently above the plate surfaces so that the insert ring 82 does not contact both plate surfaces when the cup 88 is compressed between the lips 110. As a result, the ring 82 provides only radial alignment within the bore 58, and does not define the axial position of the plates 96, 98 relative to each other or to the front chassis plate 44.

Referring to FIG. 2, each retainer plate 96, 98 is secured to the front chassis plate 44 by a number of threaded bolts 114 passing through the clearance holes 60. The bolt heads are recessed in the centerbored clearance holes 102, and the bolt ends receive threaded nuts 116 within the access holes 100. As shown in FIGS. 2 and 3, each retainer plate 96, 98 is bolted to the front chassis plate 44 by six evenly spaced bolts 114. With the spacing between the retainer plates being defined by the height of the cup 88, only the first installed, lower retainer plate 98 is compressed against the front chassis plate 44.

As shown in FIG. 4, the trunnion 52 includes a journal or pin 118 having a cylindrical portion 120 centered on the hinge axis 22, and a coaxial cylindrical head 124 having an outside diameter larger than the cylindrical portion 120 to provide a shoulder 126. The head 124 is sealably received by the shaft seal 108, and serves as the lower protruding cylindrical portion 54 of the trunnion. The cylindrical portion 120 terminates opposite the head 124 at a nose surface 128 perpendicular to the hinge axis 22. A number of threaded bores 130 are defined in the nose of the pin 118.

A first bearing cone 134 having a conical race surface 136 is closely received on the cylindrical portion 120 to abut the shoulder 126, with the cone 134 being oriented so that the race surface 136 faces generally radially outwardly and axially slightly away from the head 124 of the pin 118. A first set of tapered roller bearings 138 surrounds the first cone 134, and is contacted by the lower race 92 of the bearing cup 88. A second cone 142 identical to the first cone 134 is received on the cylindrical portion 120, but in the opposite orientation so that the cones 138 and 142 taper in opposite directions. The second cone 142 has a conical race surface 144 that faces radially outwardly and axially slightly toward the head 124 of the pin 118. A second set of tapered roller bearings 146 is positioned between the second cone 142 and the upper race 90 of the bearing cup 88.

In the preferred embodiment shown in FIG. 4, the first and second cones 134 and 142 are spaced apart by a gap 148. Narrowing of the gap 148 is limited by the axial component of the forces between the race surfaces and the rollers, so that biasing the cones together will create a pre-load of the bearing assembly. That is, the rollers will be compressed between the races even when no load is applied to the bearing assembly 48. Such pre-loading is useful where maximum system rigidity is required.

A solid spacer ring 152 is closely received on the cylindrical portion 120 of the pin 118 so that it abuts the second cone 142. The spacer ring 152 has an outside diameter the same as that of the head 124 of the pin, and is sufficiently tall so that it extends beyond the upper shaft seal 108 to be sealed circumferentially thereby when installed. A split spacer ring 154 is closely received on the cylindrical portion 120 to abut the spacer ring 152. As shown in FIG. 2, the split spacer ring 154 is taller than the thickness of the upper rear chassis plate 40, to provide a single surface for clamping by the chassis plate and trunnion cap 74. The ring 154 is split to permit pressure generated by the clamping of the trunnion cap 74 to be transmitted to the pin 118 to avoid slippage. The split ring 154 normally extends a short distance beyond the nose 128 of the pin. As shown in FIG. 4, this provides a recess for a shim or set of shims 158 to be positioned against the nose 128 without extending above the split ring 154.

An end cap 160 formed of a rigid circular plate has an outside diameter corresponding to the diameter of the pin head 124. The cap 160 is registered with the split ring 154 in face-to-face relationship with the shims 158. The end cap 160 defines a plurality of clearance holes 162 in registration with the threaded holes 130 of the pin 118. A plurality of threaded bolts 164 are threadably received by the threaded bores 130 to force the split ring 154 into forcible contact with the shims 158, and to force the spacer ring 152 and second cone 142 toward the first cone 134, increasing the pre-load of the assembly. The gap 148 between the cones and the pre-load amount are limited by the thickness of the shims 158, which provide a positive stop against excessive tightening of the bolts 164. Together, the rings 152 and 154, the end cap 160 and bolts 164 form a compression element. The head 124 of the pin 118 defines a central bore 168 for engagement by a torque wrench to test the pre-load of the assembly by determining the resistance to rotation.

FIG. 5 shows an alternative embodiment bearing assembly 48' that differs from the embodiment of FIG. 4 in that it employs a different shimming approach. The alternative assembly 48' includes a shim ring 170 positioned between the first cone 134 and second cone 142 to entirely occupy the gap 148, with the cones abutting opposite sides of the shim ring 170. The shim 158 of FIG. 4 is eliminated, leaving a nose gap 172 between the pin nose 128 and the end cap 160. The thickness of the shim ring 170 defines the spacing of the cones 134 and 142, and thereby defines the bearing pre-load amount. As installed, the end cap 160 is bolted to the pin 118 to compress the stack of the spacer rings 152 and 154, cones 134 and 142, and shim ring 170 against the shoulder 126. Although the assembly 48' must be substantially disassembled to access the shim ring 170 for replacement, this embodiment permits precise absolute spacing between the cones for a predictable pre-load amount.

The bearing cup, cones, and rollers are equivalent to part numbers 63788 and 67322D available from The Timken Company, of Canton, Ohio. These parts include the shim ring 170, which is removed in the preferred embodiment of FIGS. 1–4. The preferred embodiment bearing has a five-inch diameter bore to receive a pin of the same diameter.

INSTALLATION AND REPLACEMENT

The bearing assembly 48 of the preferred embodiment may be largely assembled, adjusted and tested before installation. A subassembly consists of the entire bearing assembly 48 minus the retainer plates 96, 98. The subassembly is constructed by sequentially installing on the cylindrical portion 120 of the pin 118: 1) the first cone 134, 2) the first bearing set 138, 3) the bearing cup 88 with its associated insert ring 82, 4) the second set of roller bearings 146, 5) the second cone 142, 6) the spacer ring 152, and 7) the split ring 154, with the shims 158 being placed on the pin nose 128 and then secured by the end cap 160. This subassembly, while not sealed against contamination, may be torque tested and adjusted in a factory environment without requiring subsequent disassembly for factory or field installation.

For installation on a vehicle, the lower retainer plate 98 is bolted to the lower side of the chassis plate 44, so that the subassembly may be installed from above, with the pin head 124 sliding through the lower shaft seal 108, and the insert ring 82 being closely received within the bore 58. The upper retainer plate 96 is then installed from above, so that the upper shaft seal 108 slides down over the end cap 160 and spacer rings 154, 152. The upper retainer plate 96 is then bolted to the chassis plate 44.

With the bearing assembly 48 installed on the front portion of the vehicle, the vehicle's rear portion 14 is positioned to align the protruding cylindrical portions 54 of the trunnion 52 within the semi-cylindrical recesses 70 of the rear chassis plates. Thus positioned, the trunnion caps 74 are installed to securely clamp the pin head 124 and split spacer ring 154. The rear chassis plates are spaced apart sufficiently so that a gap 171 is provided between each chassis plate and the respective bearing retainer plate. This permits the trunnion to be installed anywhere within a range of vertical positions, thus tolerating significant vertical dimension errors between the various chassis plates of the frames.

For replacement of a damaged or excessively worn bearing assembly in the field, the installation steps are conducted in reverse order. A replacement bearing assembly may be installed using the original installation procedure, taking care to prevent contaminants from contacting the roller bearings normally protected by the shaft seals.

ADJUSTMENT OF BEARING PRE-LOAD

Bearing pre-load may be adjusted readily in the field without substantial disassembly or any violation of the bearing seals. If normal wear causes the bearing pre-load amount to drop below the desired level, replacement of the existing shim pack with a thinner shim pack will reduce the gap between the cones, increasing the pre-load. To effect readjustment, the upper trunnion cap 74 is loosened to permit the split spacer ring 154 to slide axially with respect to the pin 118. The threaded bolts 164 are then removed, along with the end cap 160. The shim pack 158 is then replaced with a thinner shim pack, and the end cap and bolts are then reinstalled, driving the spacer rings and second cone closer to the first cone. The seals 108 are not violated, and the vehicle remains fully assembled with the lower trunnion cap 74 remaining secured to the pin head 124 throughout the readjustment process.

Having illustrated and described the principles of the invention in a preferred embodiment, it should be apparent to those skilled in the art that the invention can be modified in arrangement and detail without departing from such principles. The claimed invention includes not only the illustrated embodiment, but all modifications, variations, and equivalents thereof as come within the spirit and scope of the following claims.

I claim:

1. A hinge assembly for an articulated vehicle comprising:
   a first vehicle frame portion;
   a first bearing assembly attached to the first vehicle frame portion;
   a second bearing assembly attached to the first vehicle frame portion;
   the first bearing assembly including a first roller bearing rotatably supporting a first trunnion, the first roller bearing being fixed against radial and axial displacement relative to the first trunnion, with the first trunnion being rotatable on a hinge axis;
   the second bearing assembly including a second roller bearing rotatably supporting a second trunnion, the second roller bearing being fixed against radial and axial displacement relative to the second trunnion, the second trunnion being rotatable on the hinge axis;
   a second vehicle frame portion attached to the first and second trunnions.

2. The apparatus of claim 1 wherein the second vehicle frame portion includes removable caps defining with the frame portion a passage suitable for capturing the first trunnion and the second trunnion.

3. The apparatus of claim 1 wherein at least one of the bearing assemblies includes a pair of tapered-roller bearings.

4. The apparatus of claim 3 wherein each of the bearing assemblies includes a pair of tapered-roller bearings.

5. The apparatus of claim 1 wherein the first bearing assembly includes an inner race removably attached to the first trunnion such that the inner race and trunnion are each independently replaceable to accommodate wear.

6. A replaceable bearing assembly for use with a hinge of an articulated vehicle, comprising:
   a cylindrical trunnion pin having an axis and opposing first and second ends, and having a shoulder formed near the first end thereof;
   a cylindrical cap assembly positioned over the second end of the pin;
   a ring surrounding a middle portion of the pin so that the first end and the capped second end of the pin each protrude outside of the ring thereby to provide cylindrical parts for fastening together with trunnion caps the parts and a frame of an articulated vehicle; and
   a pair of tapered roller bearings secured between the shoulder and the cap assembly against axial movement along the pin axis and fit between the ring and the pin to be secured against radial movement relative to the pin axis, the bearing assembly being a discrete assembly that is removably fastenable to the frame.

7. The assembly of claim 6 wherein the roller bearings are fit tightly between the cap assembly and shoulder to produce through the roller bearings a load directed substantially radial to the pin axis, the bearing assembly including adjustment fasteners for changing the position of the cap assembly relative to the pin thereby changing the amount of the radial load.

8. The assembly of claim 7 including testing means attached to the pin for testing the amount of the radial load by rotating the pin within the roller bearings.

9. The assembly of claim 7 including shims contained between the cap assembly and the pin for limiting movement of the cap assembly by the adjustment fasteners.

10. A hinge assembly for an articulated vehicle comprising:
    two separate vehicle frame portions;
    a pair of bearing assemblies, each bearing assembly comprising:
       a cylindrical trunnion pin having an axis and opposing first and second ends, and having a shoulder formed near the first end thereof;
       a cylindrical cap assembly positioned over the second end of the pin;
       a ring surrounding a middle portion of the pin so that the first end and the capped second end of the pin each protrude outside of the ring thereby to provide cylindrical parts for fastening together with trunnion caps the parts and one frame portion; and
       a pair of tapered roller bearings secured between the shoulder and the cap assembly against axial movement along the pin axis and fit between the ring and the pin to be secured against radial movement relative to the pin axis; and
    a retainer connected to each bearing assembly to fix the bearing assembly to the other frame portion with the roller bearings of both bearing assemblies being substantially immovable along the axes of the pins.

11. The assembly of claim 10 including trunnion caps for clamping the protruding parts to the one frame portion.

12. The assembly of claim 10 wherein the roller bearings are fit tightly between the cap assembly and shoulder to produce through the roller bearings a load directed substantially radial to the pin axis, the bearing assembly including adjustment fasteners for changing the position of the cap assembly relative to the pin thereby changing the amount of the radial load.

13. The assembly of claim 12 including testing means for testing the amount of the radial load by rotating the pin within the roller bearings.

14. The assembly of claim 12 including shims contained between the cap assembly and the pin for limiting movement of the cap assembly by the adjustment fasteners.

15. The assembly of claim 12 including a shim member contained between the pair of roller bearings for limiting movement of the cap assembly by the adjustment fasteners.

* * * * *